Figure 1:
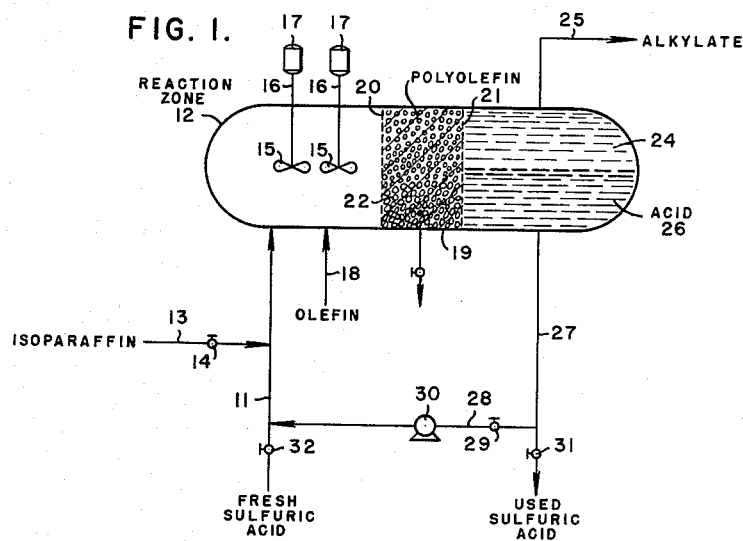

April 20, 1965 W. R. EDWARDS ETAL 3,179,603
BREAKING EMULSIONS
Filed Nov. 4, 1960

INVENTORS.
WILLIAM R. EDWARDS,
ROBERT D. WESSELHOFT,
ELROY J. PRATT,
BY
ATTORNEY.

United States Patent Office 3,179,603
Patented Apr. 20, 1965

3,179,603
BREAKING EMULSIONS
William R. Edwards, Robert D. Wesselhoft, and Elroy J. Pratt, Baytown, Tex., assignors, by mesne assignments, to Esso Research and Engineering Company, Elizabeth, N.J., a corporation of Delaware
Filed Nov. 4, 1960, Ser. No. 67,417
8 Claims. (Cl. 252—325)

The present invention is directed to a method for breaking emulsions. More particularly, the invention is concerned with resolving emulsions of a hydrocarbon and a corrosive, aqueous liquid. In its more specific aspects, the invention is concerned with resolving emulsions by contacting the emulsions with a solid hydrocarbon.

The present invention may be briefly described as a method for resolving an emulsion of a hydrocarbon and a corrosive, aqueous liquid into its component parts. In the practice of the present invention, the emulsion is contacted with solid particles of a polyolefin of a $C_2$ to $C_6$ alpha olefin. The polyolefin is insoluble in and free from attack by the components of the emulsion and the polyolefin has a density within the range of about 0.9 to about 1.0 and a molecular weight in the range from about 200,000 to about 1,000,000. The emulsion is separated into its component parts and separately withdrawn.

The polyolefin employed in the practice of the present invention is suitably a polyolefin of a $C_2$ to $C_6$ alpha olefin such as ethylene, propylene, butylenes, pentylenes, and hexylenes. Mixtures of the several alpha olefins may be employed.

The alpha olefin is suitably polymerized in the presence of a Ziegler type catalyst such as a titanium halide, particularly titanium trichloride co-crystallized with aluminum chloride and with alkyl aluminum. Examples of other suitable catalysts include, by way of illustration and not by way of limitation, chromic oxide on silica alumina, CoO and NiO on charcoal or molybdena-alumina.

The polyolefin is produced by contacting the alpha olefin with the catalyst in a suitable diluent such as a hydrocarbon diluent at a temperature within the range of —60° to about 400° F. and at a pressure within the range of subatmospheric up to about 250 atmospheres. Examples of the diluents include xylene, heptane, benzene, cyclohexane. The polymer is formed as a slurry in the diluent and the catalyst remaining is suitably killed by adding to the slurry an alcohol such as an aliphatic alcohol, particularly, methyl alcohol, although other alcohols such as isopropyl alcohol, ethyl alcohol, and n-butyl alcohol may be employed. After the catalyst has been killed, additional amounts of the alcohol are employed to precipitate the polymer from solution. Thereafter, the soluble material, including catalyst residues and soluble polymer, may be remived by filtration, leaving the solid particles of the polymer of the alpha olefin. This polymer of the alpha olefin may be reslurried in a suitable slurrying agent such as xylene, n-heptane, benzene, chlorobenzene, or cyclohexane and finally recovered by filtration, centrifugation, or decantation. The recovered polymer may then be suitably milled and/or extruded and formed into particles or pellets having a particle size within the range from about .05 to about 1 inch. It is these particles of the polyolefin which are suitable in the practice of the present invention. Particularly, polypropylene, having a density within the range from about 0.9 to 1.0 and a molecular weight within the range from about 200,000 to about 1,000,000 and having a particle size of about 0.05 to 1.0 inch, is suitable in the practice of the present invention The present invention is quite important and useful in that the polyolefin such as has been described is not affected by the corrosive aqueous liquid which forms a component of the emulsion. The polyolefin also is not affected by the hydrocarbon. In other words, the polyolefin is insoluble in and free from attack by the components of the emulsion. This is surprising in that the polyolefin is a hydrocarbon and yet it may be used to separate hydrocarbons and corrosive liquids.

As examples of the hydrocarbons which may form a component of the emulsion may be mentioned hydrocarbons such as butylenes, isobutane, gasoline boiling hydrocarbons, kerosene boiling hydrocarbons and the like. Particularly, the present invention is applicable to separation of emulsions formed by contacting a butylene mixture with sulfuric acid having a strength in the range from about 60% to about 70% in which isobutylene is recovered from the butylene mixture by reaction with the sulfuric acid. Also, the present invention is susceptible to resolving emulsions resulting from alkylation of an isoparaffin and olefin in the presence of a sulfuric acid catalyst. In these instances, the isoparaffin may suitably be isobutane or isopentane, or higher members of the same homologous series and the olefin may include butylene, pentylenes, and the higher olefins. When the emulsion results from the alkylation reaction, the acid forming a component of the emulsion may have a strength in the range from about 80% to about 100% $H_2SO_4$.

Figure 2:
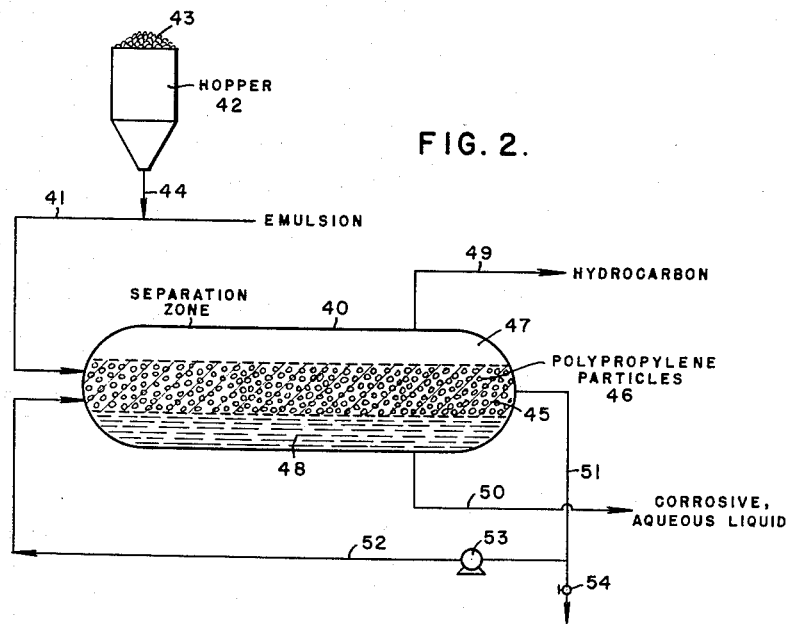

The present invention will be further illustrated by reference to the drawing which represents a preferred mode in which:

FIG. 1 is a flow diagram, partly in section, of illustrating an alkylation reaction and the separation of an emulsion formed in the alkylation reaction; and in which FIG. 2 is a flow diagram, partly in section, showing the application of the invention to separation of corrosive aqueous liquids from hydrocarbons.

Referring now to the drawing and particularly to FIG. 1, numeral 11 designates a charge line by way of which sulfuric acid is introduced into a reaction zone 12 along with isoparaffin such as isobutane introduced by line 13 controlled by valve 14. The alkylation reactor 12 is provided with stirring means 15 which are actuated through shafts 16 by prime mover 17 to cause the formation of an emulsion of the hydrocarbon and sulfuric acid catalyst, there being introduced into reaction zone 12 by way of line 18 an olefin such as a butylene mixture. An emulsion is formed in reaction zone 12. Temperatures employed in zone 12 may range from about 30° to about 60° F. at pressures sufficient to maintain a liquid phase.

Isoparaffin and olefin employed in the alkylation reaction zone 12 may suitably be in the range of about 1:1 to about 3:1 relative to the acid with the isoparaffin in excess to insure the alkylation reaction to proceed. It is necessary to use excess amounts of the isoparaffin in order to suppress any polymerization which might occur.

By virtue of the alkylation reaction taking place in alkylation reaction zone 12, there is formed an emulsion which flows through a coalescing zone indicated by numeral 19 and formed by perforated or porous barriers 20 and 21 which allow the free passage of liquid and emulsion therethrough. The barriers 20 and 21 enclose a body 22 of particles of polyolefin, suitably polypropylene, and form as a coalescing bed through which the emulsion flows from the alkylation reaction zone 12 into the settling zone 23. Therein there is a separation between the alkylate phase and the acid phase. The alkylate phase separates as a layer 24 which is withdrawn by line 25 for further handling such as water and caustic washing and distillation for recovery of the valuable alkylate and there is formed in zone 23 a layer of acid 26 which is withdrawn from zone 23 by line 27 and recycled by line 28 controlled by valve 29 and containing pump 30 to line 11.

Provision is made for discarding a portion of the used sulfuric acid catalyst and this may be done by manipulation of valve 31 in line 27. Provision is also made in line 11 for introducing a like amount of fresh sulfuric acid to compensate that withdrawn by line 27 by opening valve 32 in line 11 connecting to a source of fresh acid catalyst not shown.

In coalescing zone 19, formed by barriers 20 and 21 and the polymer particles 22, an amount of polymer particles in about 10% to 20% by volume of the contents of the alkylation zone may be employed. It has been found that about 150% of the polyolefin, based on the emulsion, may be used with satisfactory results.

By virtue of the employment of the polyolefin particles and breaking the sulfuric acid emulsion with the alkylated hydrocarbon, it is possible to break the emulsion rapidly and to eliminate any carry-over of emulsion back to the reaction zone. In other words, by separation, in accordance with the present invention, the alkylated hydrocarbon is withdrawn from the zone 23 and the sharp break in the emulsion does not allow the recycle of alkylate back to the zone 12 which may result in degradation thereof by contact with the catalyst.

Referring now to FIG. 2, numeral 40 designates a settling or separation zone into which there is introduced by way of line 41 an emulsion which may be an emulsion such as an emulsion of gasoline hydrocarbons and sodium hypochlorite solution or gasoline hydrocarbons and sodium hydroxide solution. Emulsions of lubricating oil or gas oil with aqueous sodium hydroxide may also be broken in the practice of the present invention. In any event, the emulsion in line 41 has added to it from hopper 42, containing particles 43 of polyolefins such as polypropylene, a suitable amount of polypropylene by line 44 to provide an amount of polypropylene ranging from about 10% to 90% of the emulsion by volume of the separation zone 40. A preferred amount is in the range of 20% to 30% by volume of the settling zone 40. In a steady state system, the layer of polypropylene may be at least as large as the emulsion layer. The emulsion and polyproylene particles are introduced by line 41 into zone 40 and the emulsion forms a layer 45 containing polypropylene particles 46 which serve to break the emulsion into its component parts, the hydrocarbon appearing as a layer 47 and the corrosive, aqueous liquid such as sodium hydroxide or sodium hypochlorite as a layer 48. The hydrocarbon is separately withdrawn by line 49 while the corrosive, aqueous liquid is withdrawn by line 50. A portion of the layer 45 may be recycled by line 51 and by branch line 52 containing pump 53 back into the layer 45 as has been shown. It may be desirable under some circumstances to discard part of the layer 45 and this may be done by manipulating valve 54 in line 51. Ordinarily, it will be desirable to continue recycling the layer 45 containing the polymer particles 46 and it will be unnecessary to add additional particles of the polyolefin.

The present invention is applicable to many separations of emulsions of hydrocarbons and corrosive, aqueous liquids wherein the corrosive, aqueous liquid would ordinarily attack the coalescing medium. The polyolefin is unique in that it is not attacked by the corrosive, aqueous liquid in the practice of the present invention.

In the practice of the present invention, it is important that the components of the emulsion after breaking of the emulsion be separated and separately withdrawn. If the components of the emulsion are not separately withdrawn, the emulsion is liable to reform in that the emulsions susceptible to being broken in accordance with the present invention are easily formed emulsions.

The present invention, as has been stated, is susceptible to many operations including the extraction of tertiary olefins with aqueous sulfuric acid of a strength in the range of about 60% to 80% and is also susceptible to breaking emulsions formed in the sulfuric acid catalyzed alkylation reactions. The invention is also susceptible to breaking all types of emulsions of hydrocarbon and corrosive, aqueous liquids normally encountered in a modern petroleum refinery.

The invention may be further illustrated by reference to the following example where $C_5$ hydrocarbons are separated from 65% sulfuric acid. A stable emulsion of $C_5$ hydrocarbon and the 65% sulfuric acid was introduced into a container substantially filled with polypropylene pellets having a particle size of about ⅛ inch. The settling time for the separation of the emulsion was less than 2 minutes. The same emulsion was allowed to settle with no polypropylene present and the settling time was 10 minutes.

In order to emphasize that the emulsion components after breaking must be withdrawn separately, an emulsion of hydrocarbon and sulfuric acid was passed through an enlarged section of a line containing polypropylene pellets. While some separation of the emulsion was observed, the emulsion rapidly reformed by the velocity of the flowing fluid.

The nature and objects of the present invention having been completely described and illustrated, what we wish to claim as new and useful and secure by Letters Patent is:

1. A method for resolving an emulsion of a hydrocarbon and a corrosive, aqueous acid liquid into its component parts which comprises contacting said emulsion in a settling zone with about 10% to about 90% by volume of solid particles consisting essentially of polypropylene having a density within the range from about 0.9 to about 1.0 and a molecular weight within the range from about 200,000 to about 1,000,000, said polypropylene being insoluble in and free from attack by the components of said emulsion whereby said emulsion is separated into its components, and separately withdrawing said components.

2. A method in accordance with claim 1 in which the corrosive liquid is sulfuric acid.

3. A method for resolving an emulsion of an olefinic hydrocarbon and corrosive, aqueous sulfuric acid into its component parts which comprises contacting said emulsion in a settling zone with about 10% to about 90% by volume of solid particles consisting essentially of polypropylene having a density within the range from about 0.9 to about 1.0 and a molecular weight within the range from about 200,000 to about 1,000,000, said polypropylene being insoluble in and free from attack by the components of said emulsion whereby said emulsion is separated into its components, and separately withdrawing said components.

4. A method in accordance with claim 3 in which the olefinic hydrocarbon is butylene.

5. A method in accordance with claim 3 in which the olefinic hydrocarbon is pentylene.

6. A method for resolving an emulsion of a reactive hydrocarbon and a corrosive aqueous sulfuric acid into its component parts which comprises contacting said emulsion in a settling zone with about 20% to about 30% by volume of solid particles consisting essentially of polypropylene having a density within the range from about 0.9 to about 1.0 and a molecular weight within the range from about 200,000 to about 1,000,000, said polypropylene being insoluble in and free from attack by the components of said emulsion whereby said emulsion is separated into its components, and separately withdrawing said components.

7. A method in accordance with claim 6 in which the reactive hydrocarbon comprises a mixture of olefinic and isoparaffinic hydrocarbons.

8. A method in accordance with claim 6 in which the reactive hydrocarbon comprises an olefinic hydrocarbon mixture.

References Cited by the Examiner
UNITED STATES PATENTS

| | | | |
|---|---|---|---|
| 2,429,965 | 10/47 | Shearer et al. | 260—683.62 |
| 2,542,147 | 2/51 | Krewer et al. | 252—325 XR |
| 2,859,260 | 11/58 | Stiles | 210—23 |
| 2,906,610 | 9/59 | Clinkenbeard et al. | 260—683.62 |
| 2,907,717 | 10/59 | Hann | 252—325 |

JULIUS GREENWALD, *Primary Examiner.*